Figure 1:
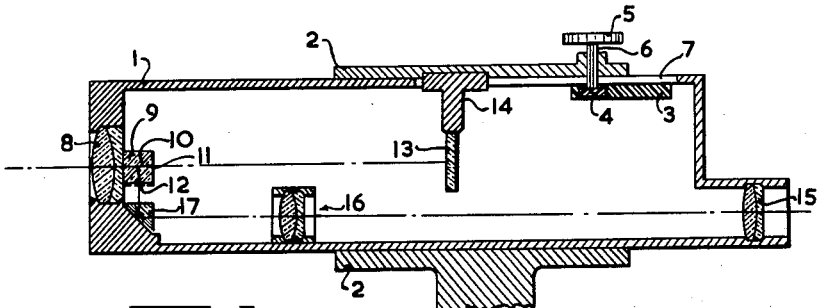

April 11, 1961   W. MANDLER   2,978,950
UNIVERSAL ALIGNMENT INSTRUMENT
Filed Dec. 6, 1957

INVENTOR.
Walter Mandler
BY
Cushman, Darby & Cushman
Attorneys

United States Patent Office 2,978,950
Patented Apr. 11, 1961

2,978,950

UNIVERSAL ALIGNMENT INSTRUMENT

Walter Mandler, Midland, Ontario, Canada, assignor to Ernst Leitz G.m.b.H., Wetzlar, Germany Filed Dec. 6, 1957, Ser. No. 701,255

Claims priority, application Germany Dec. 10, 1956

6 Claims. (Cl. 88—14)

This invention relates to a telescopic instrument having many applications in optical aligning and direction determination.

For simultaneous observation of a reticle and an image, the objective of a telescope must form an image at the position of the reticle, and the two are then observed through an eyepiece. In a simple telescope the image formed by the objective is focused at the reticle by adjusting the physical separation between the objective and the reticle and this distance is, of course, different for different object distances. In practice, the mechanical means by which the reticle or objective is moved is subject to inaccuracies and the reticle or objective may, during its movement along the line of aim of the telescope, be displaced transversely of that line. Such a transverse displacement of the reticle or objective results in an aiming error which is proportional to the magnification of the objective lens. If the actual transverse displacement of the reticle or objective is represented by $d$, and the objective has a transverse magnification B, then the resultant aiming error $E_a$, which is the transverse distance by which the telescope's line of aim misses the object point, will be $$E_a = Bd \quad \text{(Eqn. 1)}$$

Since the transverse magnification B is a function of object distance, the magnitude of $E_a$ will also be a function of object distance. If such a telescope is used to position several points on a given line, a different aiming error is involved in focussing on each of the objects and the resultant alignment will not be accurate.

It is therefore an object of this invention to provide a telescopic alignment instrument in which focussing is accomplished without relative movement between the reticle and the objective.

Telescopes have, of course, already been designed with a fixed distance between the reticle and objective, focussing being accomplished by means of an axially movable lens positioned between the objective and the reticle. These internal focussing telescopes, as they are called, also suffer from the aiming error described above, although to a lesser degree than the simple telescope. In such telescopes the error arises from transverse displacement of the focussing lens during the focussing operation.

By proper choice of the focal lengths of the objective and focussing lenses and their separation, the aiming error can be minimized, but the extent to which this error can be reduced is limited by the necessity of meeting other design requirements. Normally, this error may be reduced only to ⅓ of the error present in simple telescope previously mentioned.

It is therefore a further object to provide a telescopic instrument with even less instrument error than that inherent in the internal focussing telescopes.

In optical aligning it is well known to use a telescope in conjunction with a collimator. The collimator has an illuminated reticle at the focus of its objective and therefore provides the telescope with a point object at infinity. Focussing the telescope on this infinite point allows the direction of the telescope's line of aim to be fixed, but a second object point at a finite distance is required to define a unique line with which the line of aim may be aligned. In practice, the finite point may be defined by a reticle fixed to the collimator and in front of the collimator objective. The telescope is then focussed alternately upon the finite and infinite points. By centering the image of the infinite point in the telescope reticle, the direction of the telescope line of aim is determined and subsequently must be maintained constant by ensuring that only transverse motion of the telescope takes place when centering the image of the finite point. This necessity to focus, observe and center each image separately makes the alignment process difficult.

It is therefore an object of the present invention to provide a telescopic instrument having less inherent instrument error than an internal focussing telescope and in which a finite and an infinite object point may be observed simultaneously.

According to the present invention the improved telescopic instrument has an objective lens, and a reticle fixed as close as possible to the second principal point of the objective lens. A reflective surface is mounted between the objective and its second principal focus and positioned to reflect rays from the objective to the reticle. The distance between the reflecting surface and objective is adjustable for focussing the image at the reticle, but the reticle and objective are fixed relative to each other. Viewing means is provided for observing the reticle and the image formed there. In realizing the last mentioned object of the invention, the reflective surface is made partially transmitting and a second reticle is positioned at the focus of the objective. This second reticle is also observed by viewing means.

Figure 2:
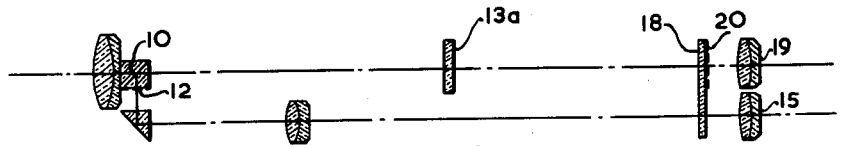
Figure 3:
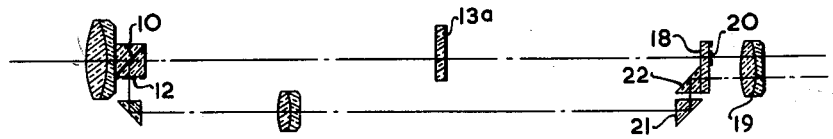

Further description of the invention will be facilitated by reference to the drawing in which: Fig. 1 is an axial sectional view of a simple form of the present invention, and Figures 2 and 3 show the elements of other embodiments of the invention, the enclosing and supporting structures having been removed.

Referring now to Figure 1, it will be seen that the telescope tube 1 is mounted in a support 2, the tube being movable through the support by means of a rack 3 fixed to the tube and an associated pinion gear 4 which is controlled by the focussing knob 5. The achromatic objective lens 8 is mounted in one end of the tube 1 and has secured to its rear surface, as by cementing, a 45°–45°–90° prism 9 having a reflecting coating 10 on its angularly positioned surface. Cemented to the coating 10 is the broad face of another 45°–45°–90° prism 11 which serves the dual purpose of protecting the coating 10 and supporting a reticle 12. Reticle 12 is shown as being fixed to the horizontal face of prism 11 but it may alternatively be fixed to the vertical face.

Light rays emanating from an object point are focussed at the reticle 12 by means of objective 8 and reflecting mirror 13 which is rigidly fixed in position relative to the telescope mounting by virtue of the mirror support 14 being secured to tube support 2. Slot 7 permits tube 1 to be moved axially with respect to support 14 and pinion shaft 6 to adjust the distance between mirror 13 and the objective and reticle. It will be apparent that reticle 12 and objective 8 move as a single unit and the physical separation between them is constant and very small. Ideally, the reticle should be at the second principal point of the objective 8, but in practice one can only ensure that the reticle is as close to this position as is physically possible. Being spaced from the objective's second principal point by a negligible distance, it will be apparent that any displacement of the objective-reticle assembly transverse to the telescope's line of aim, will result in an aiming error equal to the actual transverse displacement. If the transverse displacement is again $d$ then the aiming error $E_A$ is $$E_A = d \qquad \text{(Eqn. 2)}$$

Comparing this with Equation 1 for a simple telescope, it will be apparent that the objective's transverse magnification B no longer appears in the expression.

Referring again to the structure shown in Figure 1, the image focussed at the reticle 12 is observed by means of eye piece 15, fixed lens system 16 and totally reflecting prism 17. These are all standard elements. If it is desired to have an additional reticle in the system, it may be placed in front of the eye piece 15, in which case lens system 16 is designed to focus the image at the second reticle, and eye piece 15 is designed to observe the second reticle.

It will be apparent to those skilled in the art that the observing system including elements 15, 16 and 17 may be replaced by any other system suitable for observing the image formed at reticle 12. For example, elements 16 and 17 could be dispensed with if an eyepiece with an axis transverse to the main instrument axis were positioned in the tube 1 adjacent the reticle 12. However, for alignment purposes it is desirable for the observer to sight in the direction of the object, and accordingly a viewing system such as that illustrated is preferred.

It should be noted that since mirror 13 does not move during focussing and is rigidly fixed to the tube support 2, it is relatively undisturbed by manual operation of the focussing knob 5. Accordingly, the inherent accuracy of the instrument depends principally upon how accurately the objective-reticle combination is centered on the instrument's line of aim during focussing and, in any case, the aiming error due to any transverse displacement of this combination is only of the same order as the transverse displacement, as discussed previously.

The instrument thus far described may, of course, be focussed for only one object distance at any given time. To overcome the previously described difficulty in using such an instrument in alignment work with a point object at infinity and one at a finite distance, this instrument is modified, according to the present invention, as shown in Figure 2. The modifications consist in replacing totally reflecting mirror 13 by a partially transmitting mirror 13a and by providing a reticle 20 at the second principal focus of objective 8 together with an additional eyepiece 19. The reticle 20 is supported by a glass plate 18 extending in front of both eye pieces. Those rays emanating from the infinite point object and passing through partially transmitting mirror 13a will accordingly be focussed at reticle 20 at all times and may be observed through eyepiece 19. Those rays emanating from the finite object point and reflected from partially transmitting mirror 13a will, as in Figure 1, be focussed at reticle 12 by adjusting focussing knob 5. The previously described system for observing this image now includes the unmarked lower half of plate 18. It should be noted that the focus of the infinite point image is not affected when focussing on the finite object point. Further, once the line of aim of the instrument has been given the required direction by centering the infinite point image at the center of reticle 20, any accidental change in this direction when moving the instrument transversely to center the finite point image on reticle 12 will be readily apparent to the operator as a displacement of the infinite point image from the center of reticle 20. This is an important advantage over prior instruments and greatly simplifies alignment.

As a further refinement of the present invention the instrument may be modified to permit observation of both the finite and infinite image points through the same eyepiece. Such a modification is shown schematically in Figure 3 which is identical to Figure 2 except that eyepiece 15 has been dispensed with and two totally reflecting prisms 21 and 22 have been added to the system for observing reticle 12. Reticle 20 now covers only the upper part of the field of view of eyepiece 19 while the image of reticle 12 covers the lower part. The observer therefore sees an upper and a lower reticle and may conveniently observe the point images on both of them while manoeuvring the instrument or the object points into the required position.

I claim:

1. An optical alignment instrument for simultaneous observation of an infinite distance and a finite distance object point and defining an optical axis, which comprises, an objective lens on said axis and defining a focal plane intercepted by the axis, a first reticle in the focal plane, an eye piece for observing the first reticle and an image of the infinite distance object point at the first reticle, a beam divider having a partially transmitting surface positioned on the axis between the objective and the focal plane, and being movable in the direction of the optical axis, light deflecting means and a second reticle adjacent said objective, said deflecting means so constructed and arranged to deflect light transmitted by the objective and reflected by said surface onto said second reticle so as to focus the image of the finite distance object point and means affording a view of the second reticle and an image of the finite distance object point to an observer in the vicinity of said eyepiece.

2. An instrument as defined in claim 1, including a deflecting prism for light from the image brought to a focus by said deflecting means, said prism having a totally reflective surface, the last mentioned surface being arranged at an angle to the optical axis, said second reticle being fixed closely adjacent to said deflecting prism, and said deflecting prism being mounted at the side of said objective lens closest to said focal plane.

3. An instrument as defined in claim 2 wherein said reflecting surface is rigidly fixed to a support for said instrument, and said objective and the first reticle are movable as a unit to focus rays transmitted by said objective at the first reticle.

4. An instrument as defined in claim 2 wherein the reflecting surface is rigidly fixed to a support for said instrument and the objective, and both said reticles are in fixed relative spacial relation, and are movable as a unit to focus rays transmitted by said objective at the first reticle.

5. An instrument as defined in claim 2 wherein said means for affording a view of the second reticle comprises, an intermediate lens system and a second eyepiece.

6. An instrument as defined in claim 2 wherein said means for affording a view of the second reticle comprises, an intermediate lens system and further deflecting means arranged so that light reflected at said partially reflecting surface is deflected into said eyepiece.

References Cited in the file of this patent

UNITED STATES PATENTS

| | | |
|---|---|---|
| 893,836 | Czapski | July 21, 1908 |
| 921,773 | Wild | May 18, 1909 |
| 2,701,501 | Cuny | Feb. 8, 1955 |
| 2,884,830 | Hildebrand | May 5, 1958 |